(12) United States Patent
Scheu et al.

(10) Patent No.: US 11,742,784 B2
(45) Date of Patent: Aug. 29, 2023

(54) METHOD FOR DETERMINING THE ERROR VOLTAGE OF A CURRENT CONVERTER AND THREE-PHASE MACHINE HAVING ERROR VOLTAGE COMPENSATION

(71) Applicant: Liebherr-Components Biberach GmbH, Biberach an der Riss (DE)

(72) Inventors: Tobias Scheu, Grabenstetten (DE); Gernot Schullerus, Reutlingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 801 days.

(21) Appl. No.: 16/768,839

(22) PCT Filed: Oct. 18, 2018

(86) PCT No.: PCT/EP2018/078599
§ 371 (c)(1),
(2) Date: Jun. 1, 2020

(87) PCT Pub. No.: WO2019/077059
PCT Pub. Date: Apr. 25, 2019

(65) Prior Publication Data
US 2022/0416708 A1 Dec. 29, 2022

(30) Foreign Application Priority Data

Oct. 18, 2017 (DE) .................... 10 2017 009 707.0
Dec. 1, 2017 (DE) .................... 10 2017 128 602.0

(51) Int. Cl.
*H02P 21/04* (2006.01)
*H02P 27/04* (2016.01)
(Continued)

(52) U.S. Cl.
CPC ........ *H02P 27/047* (2013.01); *H02M 1/0009* (2021.05); *H02M 1/385* (2021.05)

(58) Field of Classification Search
CPC ........ H02P 21/04; H02P 27/047; H02M 7/48; H02M 1/385; H02M 1/0009
See application file for complete search history.

(56) References Cited

U.S. PATENT DOCUMENTS

| 5,475,293 A | 12/1995 | Sakai et al. |
| 6,362,593 B1 | 3/2002 | Lee |

(Continued)

FOREIGN PATENT DOCUMENTS

| EP | 0704709 | 4/1996 |
| GB | 2417623 | 3/2006 |

(Continued)

OTHER PUBLICATIONS

Khambadkone, A. et al., "Vector controlled induction motor drive with a self-commissioning scheme," IEEE Transactions on Industrial Electronics, vol. 38, Issue 5, pp. 322-327, Oct. 1991.

*Primary Examiner* — Cortez M Cook
(74) *Attorney, Agent, or Firm* — Levine Bagade Han LLP

(57) ABSTRACT

The invention relates to a method for determining an error voltage of a current converter to which a load, in particular in the form of a three-phase machine such as an asynchronous machine, is connected, is determined and if necessary compensated, wherein an output voltage on the current converter is increased stage-by-stage or step-by-step and which is measured here as a current adjusting a step response. The invention further relates to a three-phase machine, for example in the form of an asynchronous machine having power electronics comprising a current converter and in the form of a compensation device for compensating the error voltage of the current converter. The invention further relates to a method for operating and/or controlling such a three-phase machine, in which the error voltage of the current converter is determined and compensated. According to the invention, the error voltage is (Continued)

Figure 1:
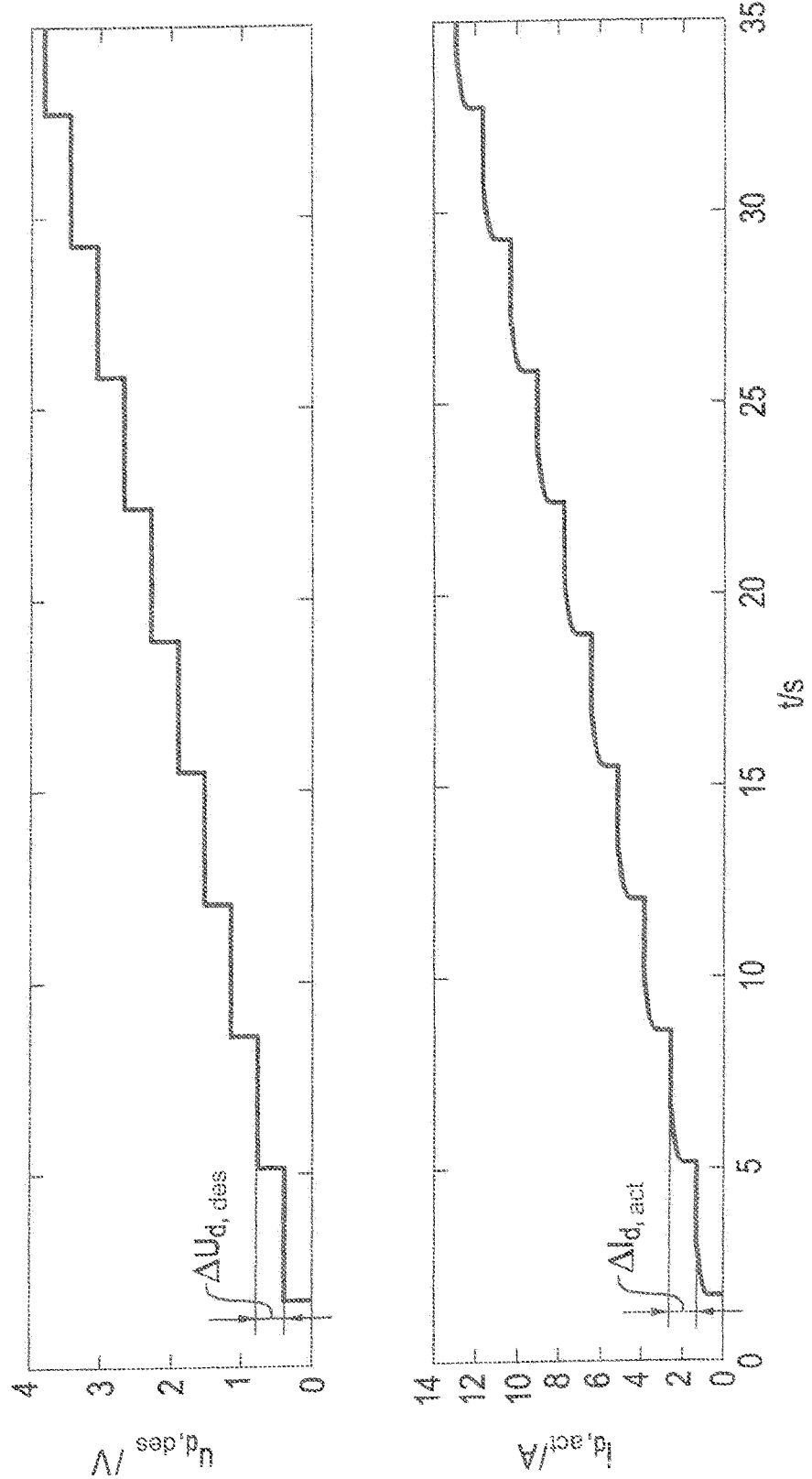

determined from the current measured as a step response and from a resistance of the load, wherein said resistance is determined from a target voltage jump and from a simultaneously measured actual current jump in a relatively high current range of at least 30% of at least 50% of the rated current of the end stage of the current converter.

16 Claims, 4 Drawing Sheets

(51) Int. Cl.
  *H02M 1/38* (2007.01)
  *H02M 1/00* (2006.01)

(56) References Cited

U.S. PATENT DOCUMENTS

| | | | |
|---|---|---|---|
| 8,084,986 B2 | 12/2011 | Cheng et al. | |
| 2006/0055362 A1* | 3/2006 | Tobari | H02P 21/04 |
| | | | 318/716 |
| 2010/0007299 A1 | 1/2010 | Davis et al. | |
| 2011/0156632 A1 | 6/2011 | Cheng et al. | |

FOREIGN PATENT DOCUMENTS

| | | | | |
|---|---|---|---|---|
| KR | 20090058590 A * | 6/2009 | | H02M 7/48 |
| WO | WO 2019/077059 | 4/2019 | | |

* cited by examiner

METHOD FOR DETERMINING THE ERROR VOLTAGE OF A CURRENT CONVERTER AND THREE-PHASE MACHINE HAVING ERROR VOLTAGE COMPENSATION

CROSS-REFERENCE TO RELATED APPLICATIONS

This application is a U.S. national phase under 35 U.S.C. 371 of International Patent Application Number PCT/EP2018/078599 filed Oct. 18, 2018, which claims priority to German Patent Application Numbers 10 2017 009 707.0 filed Oct. 18, 2017 and 10 2017 128 602.0 filed Dec. 1, 2017, the contents of which are incorporated herein by reference in their entireties.

The present invention relates to a method of determining an error voltage of a current converter to which a load, in particular in the form of a three-phase machine such as an asynchronous machine, is connected, is determined, and is optionally compensated, wherein an output voltage at the current converter is increased stagewise or stepwise and the current adopted as the step response in this process is measured. The invention further relates to a three-phase machine, for example in the form of an asynchronous machine, having power electronics comprising a current converter and a compensation device for compensating the error voltage of the current converter and furthermore to a method of operating and/or controlling such a three-phase machine in which the error voltage of the current converter is determined and compensated.

When operating a three-phase machine such as an asynchronous machine at a frequency converter, the voltage value actually applied to the output of the frequency converter as rule differs from the predefined desired value. The reasons for such a difference of the output voltage can be of different characters and can in particular comprise the interlocking time between the upper and lower switches of a bridge section, the switching delays of the power switches, the voltage drop at the power switches in the switched-on state, the voltage drop at the freewheeling diodes, and the real switch-on and switch-off behavior of the power switches.

Said interlocking time is provided here to avoid a short circuit of the individual bridge sections of the end stage.

The switching delays are predefined by the power switches integrated in the end stage and depend on the amount of the output current of the frequency converter, with said switching delays being able to be divided into switch-on delays and switch-off delays. With so-called IGBTs, i.e. insulated gate bipolar transistors, the switch-on delay does not play any great role since it is small and less current-dependent, while in contrast hereto the switch-off delay is considerable and depends greatly on the current. The switch-off delay accordingly decisively influences the output voltage of the frequency converter in dependence on the amount of the output current.

Said voltage drop at the power switches in the switched-on state and said voltage drop at the freewheeling diodes is respectively dependent on the amount of the output current.

Said real switching flanks of the output voltage furthermore do not run ideally. An ideal or non-ideal extent of the switching flanks here means that the power switches cannot switch from the switched off state into the switched on state and conversely from the switched on state into the switched off state in an infinitely short time. The switching flanks of the output voltage accordingly do not run infinitely steeply so that the output voltage varies its value within the switch on delays and the switch off delays during the transition from the switched off state into the switched on state or conversely from the switched on state into the switched off state of the power switches. In this respect, the output voltage has a non-linear extent with respect to the time axis within these transitions. Since the switch off delay is considerably greater than the switch on delay in said IGBTs, the switch off behavior of the IGBTs has a much larger influence on the deviation of the output voltage than the switch on behavior.

Finally, the switch on and switch off behavior of the power switches is likewise dependent on the amount of the output current.

These different influences on the error voltage of a frequency converter and their dependence on the level of the output current makes the identification of the parameters of the three-phase machine and/or of the power electronics required for its operation difficult. Similar problems result not only with frequency converters, but also with other current converters such as rectifiers, inverters, or other converters, with such current converters also being able to comprise, in addition to the already named IGBTs, other electronic components such as diodes, transistors, thyristors, MOSFETs, IGCTs, or other semiconductor components also not only being able to occur in asynchronous machines operated thereat, but also in other three-phase machines such as synchronous machines.

In this respect, for the parameter identification, the three-phase machine can be excited with a desired voltage $u_{d,des}$, wherein said desired voltage $u_{d,des}$ is increased in jumps or in stages with a plurality of voltage jumps $\Delta u_{d,des}$ and the current $i_{d,act}$ respectively occurring as the step response being measured. This increase in stages or in jumps of the desired voltage can here be repeated so often until the nominal current $I_N$ of the three-phase machine is reached.

The extent of the desired voltage $u_{d,des}$ increased in this manner and the step response adopted here in the form of the measured current $i_{d,act}$ can, for example, be seen from FIG. 1. The respective desired voltage $u_{d,des}$ is there entered in volts and the respective actual current $i_{d,act}$ is there entered in amperes over time, with a voltage jump $\Delta U_{d,des}$ and an actual current jump $\Delta i_{d,des}$ occurring as a response also being able to be seen from the representation of FIG. 1.

Different parameters such as the stator resistance of the three-phase machine, the rotor resistance, a main inductance, or a stray inductance in an equivalent circuit diagram can be identified in dependence on the current using the desired or measurement data $u_{d,des}$ and $i_{d,act}$.

In this respect, however, the difference of the actual output voltage $u_{d,act}$ from the specified desired value $u_{d,des}$ results in large differences in the parameters identified. To alleviate this or in the best case to eliminate it completely, the error voltage, i.e. the difference of the output voltage actually applied at the frequency converter output from the specified desired value, is to be determined and to be compensated.

Different approaches already exist for the compensation of the error voltage of a frequency converter. For example, the output voltage of the frequency converter can be adapted by the set interlocking time in dependence on the phase current polarity to compensate the interlocking time. In this respect, the output voltage is corrected by a constant value, with the current dependent reasons for the error voltage such as switching delays of the power switches, a voltage drop at the power switches in the switched on state, a voltage drop at the freewheeling diodes, and the real switching behavior of the power switches not being taken into account. If, for example, a bridge section is looked at, the error voltage depends on the phase current polarity. A lower voltage than specified by the desired value is therefore obtained at the output for positive phase currents, while a higher voltage than specified by the desired value is obtained at the output for negative phase currents. The amount of the difference between the real output voltage and the desired value is of a respective equal amount for the positive and the negative phase current. The correction of the output voltage in dependence on the phase current polarity can here specifically take place in two manners. On the one hand, the pulse width of the pulse width modulation signals of the individual bridge sections can be corrected by the interlocking time in dependence on the phase current polarity. On the other hand, the desired values of the output voltage can be corrected by a constant error voltage in dependence on the phase current polarity.

If the correction of the output voltage takes place via a correction of the desired values of the output voltage, the error voltage $u_F$ can be determined from the pulse width modulation duty cycle frequency $f_{PWM}$, the interlocking time $T_\alpha$ and the intermediate circuit frequency $U_z$ using the relationship $$u_F = f_{PWM} T_\alpha U_z$$

To compensate the error voltage caused by switching delays and by the real switching behavior of the power switches, the switch on flanks and switch off flanks of the power switches are frequently linearized, with the switch on time and the switch off time of the power switches being able to be seen from the datasheet of the end stage. The voltage drop at the power switches in the switched on state and the voltage drop at the freewheeling diodes can also be seen from the datasheet of the end stage. Since the switch on times and the switch off times, the voltage drop at the power switches in the switched on state, and the voltage drop at the freewheeling diodes are current dependent and since as a rule only a value for the nominal current of the end stage is specified in the datasheet, such an error voltage compensation suffers greatly with respect to its exactness.

To improve the accuracy of the error voltage compensation, the extent of the error voltage in a specific current range can be approximately calculated or estimated in dependence on the current. In this respect, a linear or exponential relationship between the error voltage and the current is frequently assumed. To more exactly compensate the current dependent influences of switching delays, of the voltage drop at the power switches in the switched on state, of the voltage drop at the freewheeling diodes, and of the real switching behavior, it is meaningful to characterize the end stage used by a characteristic curve that describes the relationship between the error voltage and the output current of the frequency converter in the form $u_F(i)$.

Documents U.S. Pat. No. 8,084,986 B2, US 2011/0156632 A1, or GB 2417623 A show the determination and use of such a characteristic curve $u_F(i)$ to compensate the error voltage of a frequency converter.

Furthermore, the voltage time area of a voltage pulse of the output voltage or the DC voltage value of the output voltage or the DC voltage value for different output currents can be metrologically determined for the identification of the error voltage of an end stage, for which purpose the end stage can be loaded with a defined ohmic inductive load. The characteristic curve of the error voltage in dependence on the current $u_F(i)$ can be determined by a comparison of the measured voltage time area with the ideal voltage time area of the output voltage or by a comparison of the measured DC voltage value with the ideal DC voltage value of the output voltage. The ideal voltage time area and the ideal DC voltage value are here determined by the specified desired value of the output voltage. The characteristic curve $u_F(i)$ that can hereby be determined can be subsequently implemented in the software of a frequency converter to carry out an error voltage compensation at the running time of the measurement of the parameter identification. It is, however, disadvantageous in this respect that an additional voltage measurement has to be performed to characterize the end stage.

Starting from this, it is the underlying object of the present invention to provide an improved method of determining the error voltage of a frequency converter, an improved method of operating and/or controlling a three-phase machine, and an improved three-phase machine of the initially named kind, to avoid the disadvantages of the prior art, and to further develop it in an advantageous manner. A simple, but nevertheless exact determination and compensation of the error voltage of a frequency converter should in particular be made possible that sufficiently takes account of the current dependence of the reasons for the error voltage of a frequency converter.

In accordance with the invention, said object is achieved by a method in accordance with claim 1, by a method in accordance with claim 12, and by a three-phase machine in accordance with claim 15. Preferred embodiments of the invention are the subject of the dependent claims.

It is therefore proposed to start from the respective desired voltage for the determination of the error voltage and to correct the former by a current dependent correction member, with said current dependent correction member being determined from a current value measured as a step response and from a resistance of the load. The resistance, in particular the stator resistance, of the three-phase machine, is here determined from a desired voltage jump and from an actual current jump occurring in this process in a sufficiently high current range to reduce the error voltage influence on the measured step response of the actual current. Provision is made in accordance with the invention that the error voltage is determined from the current measured as the step response and from a resistance of the load, wherein said resistance is determined from a desired voltage jump and from an actual voltage jump measured in this process in a relatively high current range of at least 30% or at least 50% of the nominal current of the end stage of the current converter.

On the one hand, the resistance determination is simplified since the respective specified desired value of the voltage jump is used. On the other hand, an inaccuracy implied per se by the non-consideration of the actual error voltage can nevertheless be avoided or at least greatly reduced when a desired voltage jump and the actual current measured as the step response is used for the determination of the resistance in a relatively high current range that is sufficiently close to the nominal current of the end stage of the current converter. This approach is based on the consideration that the actual voltage jump is distorted or falsified to a relatively high amount in low current ranges far remote from the nominal current due to the influence of the error voltage, while the step level of the actual voltage jump $\Delta u_{d,act}$ more exactly approaches the specified desired value $\Delta u_{d,des}$ at high currents in the region of the nominal current of the end stage since the current dependent characteristic curve of the error voltage $uF(i_d)$ runs approximately horizontally in the region of the nominal current of the end stage.

The determination of said resistance that can be considered as the stator resistance of a three-phase machine on the connection of the three-phase machine to the current converter is advantageously carried out independently of the error voltage, without the accuracy in the determination of the error voltage of the current converter being significantly degraded hereby.

The current range, in which the actual current jump that is adopted on a corresponding desired voltage jump and is used for the determination of the resistance is measured, can advantageously amount to 75% to 125% or 90% to 105% of the nominal current of the end stage or of the three-phase machine.

Said main resistance can in particular be determined in accordance with the relationship $$R_1 = \frac{\Delta U_{d,des}}{\Delta I_{d,act}},$$

where $R_1$ is the main resistance, $\Delta U_{d,des}$ is a predetermined desired voltage jump, and $\Delta U_{d,act}$ is the actual current jump measured at this desired voltage jump.

The error voltage can advantageously be determined using the relationship $$U_F = U_{d,des} - R_1 I_{d,max}$$

where $u_F$ is the error voltage, $u_{d,des}$ is the end value of the desired voltage jump, $R_1$ is the load resistance, and $I_{d,max}$ is the end value of the actual current measured as the step response.

An error characteristic curve $u_F(i)$ that indicates the error voltage of the current converter in dependence on the current can advantageously be used to characterize the error voltage behavior of the current converter, in particular of the frequency converter.

Such an error voltage characteristic curve can advantageously be determined from a plurality of measurement points with respect to said error voltage between which interpolation, in particular a linear interpolation, can take place. Said measurement points for the error voltage can be determined in the aforesaid manner in that the main resistance, in particular the stator resistance of the three-phase machine, is calculated in a sufficiently high current range from the actual current jump occurring there and is determined from the desired voltage value and said correction member.

Such an error voltage characteristic curve $u_F(i)$ can then advantageously be used in the operation and/or control of a three-phase machine to correct the control parameters for the current converter accordingly so that the voltage actually applied at the output of the current converter comes as close as possible to the wanted desired voltage. A correction value can in particular be determined in a current dependent manner from the error voltage characteristic curve and the control of the current converter can be corrected by said correction value to compensate or at least to largely reduce the error voltage at the current converter. A control of the current converter corrected in such a manner can be implemented in a control module of the power electronics or in the software of a control module of the control device.

The measurement values of the step responses occurring for specific desired voltage jumps and measured in the form of the actual current can here be detected at the three-phase machine that is to be operated or to be controlled and that is connected to the respective current converter or frequency converter, with said three-phase machine advantageously being able to be online or in operation for this purpose. The three-phase machine is for this purpose only intelligently controlled in the described manner via the current converter, with predetermined voltage values being set and the adopted step response of the current being detected to determine the stator resistance of the three-phase machine in said manner independent of the error voltage and to determine the error voltage characteristic curve $u_F(i)$. A desired voltage module to specify desired voltage values that increase in steps and/or stages, a detection device for detecting the actual current adopted as the step response in this process, and a determination device for determining the stator resistance and furthermore the error voltage in the aforesaid manner can for this purpose be provided at the three-phase machine and/or at a compensation device connected thereto.

Alternatively, it would, however, generally also be possible to determine the error voltage of the current converter with the aid of an end stage to which the current converter is connected, with said end stage advantageously being able to have a similar characteristic, in particular a similar nominal current, to the three-phase machine to be operated by the current converter. The error voltage characteristic curve $u_F(i)$ of the current converter determined with the aid of such an end stage can then be implemented in the control of the three-phase machine to compensate the error voltage of the current converter in said manner.

Figure 2:
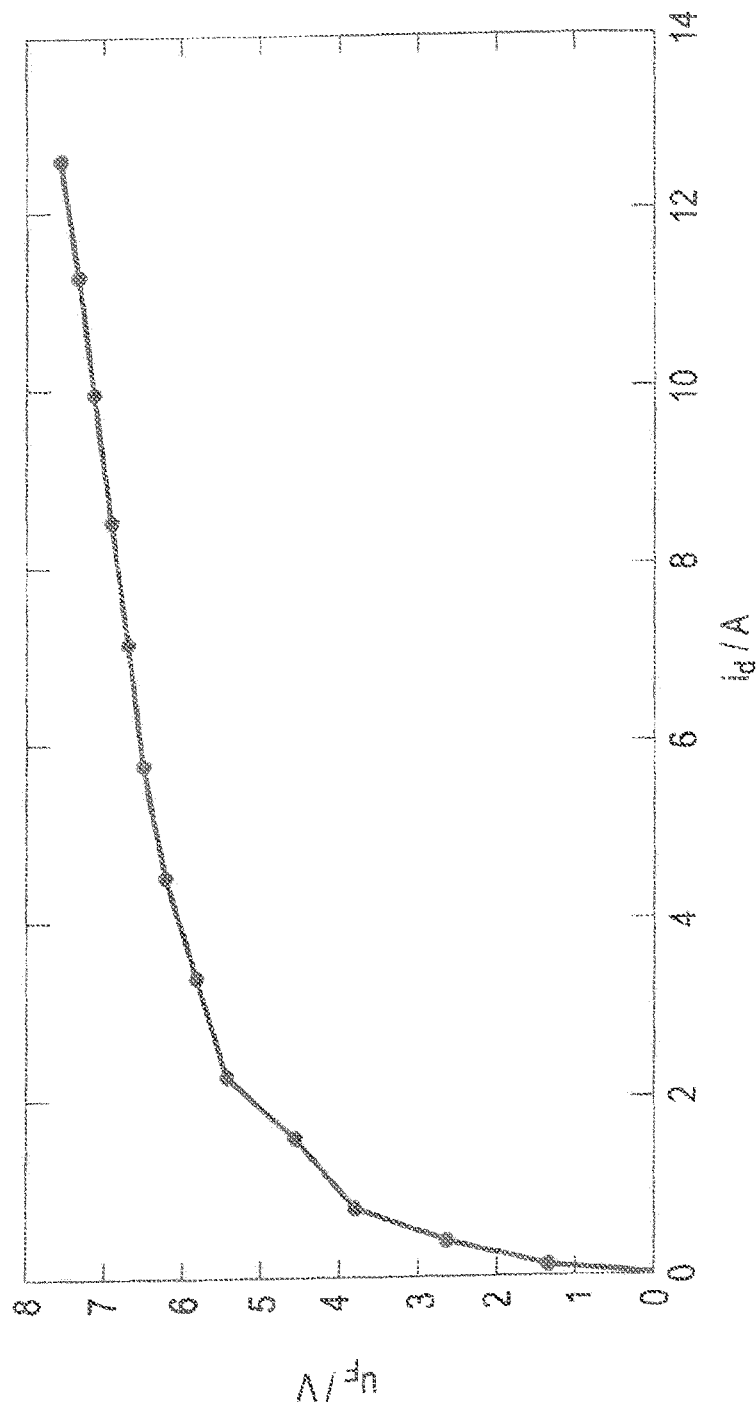
Figure 3:
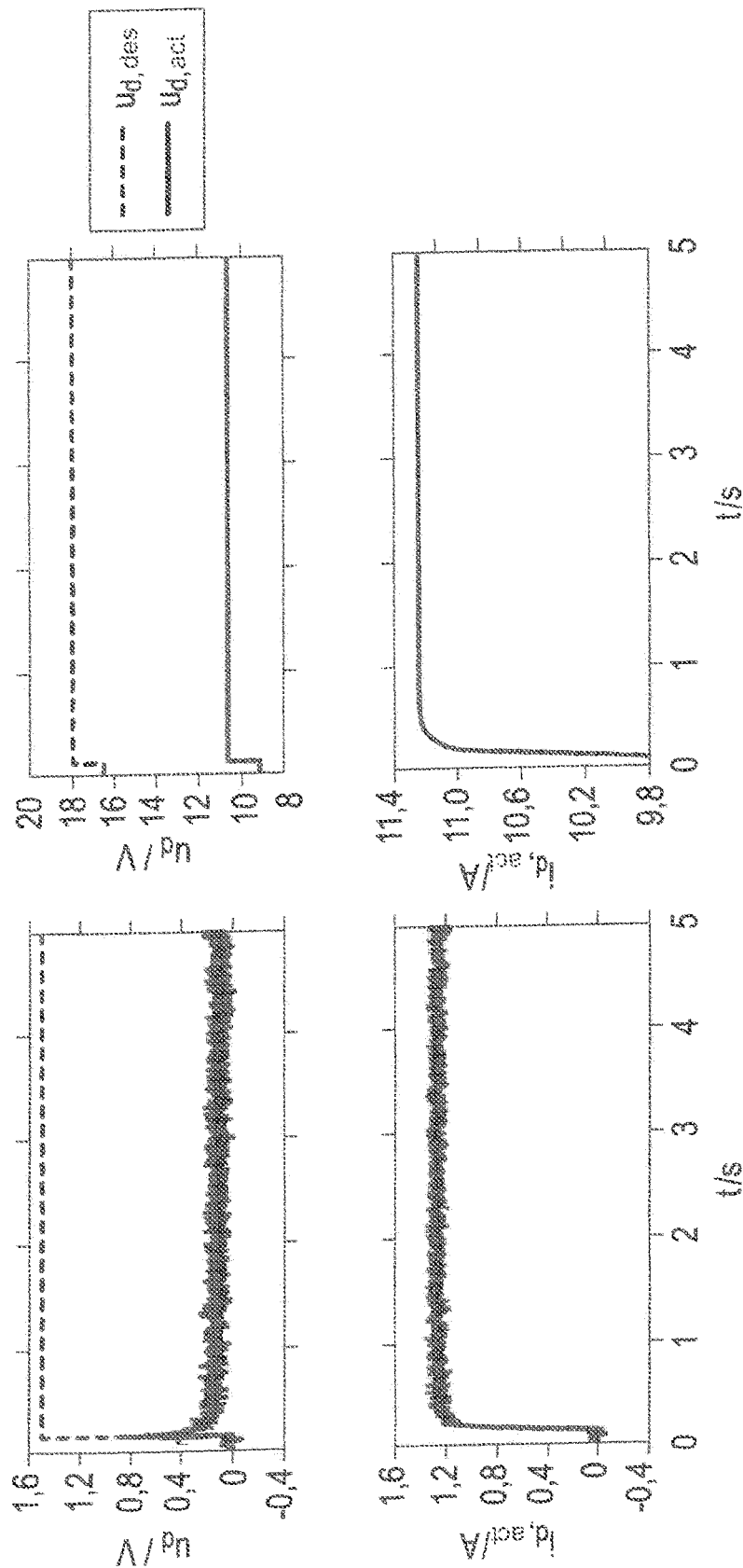
Figure 4:
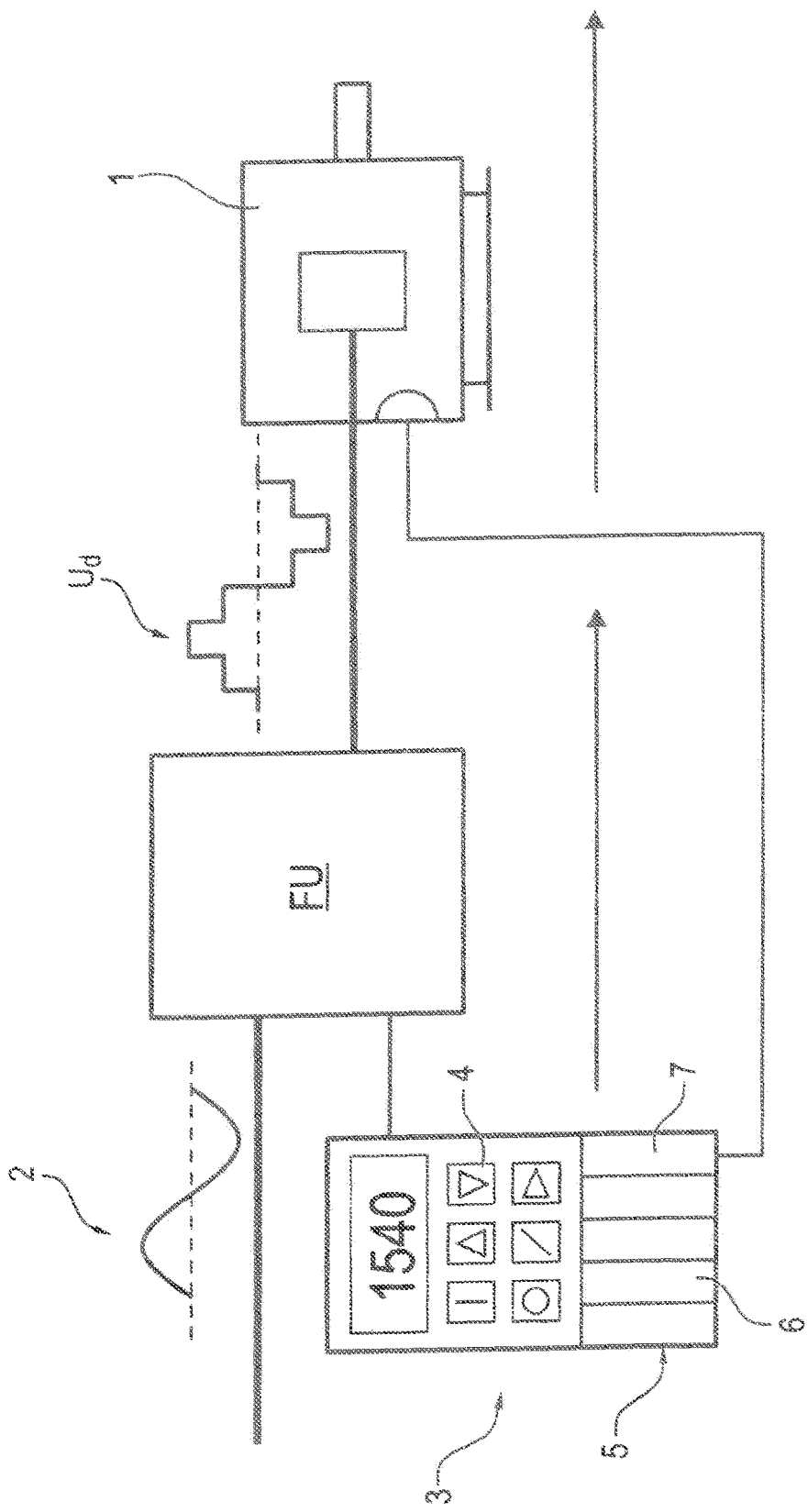

The invention will be explained in more detail in the following with respect to an embodiment and to associated drawings. There are shown in the drawings:

FIG. 1: a diagram-like representation of a jump-wise increasing desired voltage curve $u_{d,des}$ over time and a step response adopted in this process in the form of an actual current $i_{d,act}$ over time for the parameter identification of a three-phase machine such as an asynchronous motor;

FIG. 2: an error voltage characteristic curve $u_F(i_d)$ of the current dependent error voltage of a frequency converter to which said three-phase machine is connected determined from the desired voltage extent and from the detected actual current response in accordance with FIG. 1;

FIG. 3: a schematic representation of a voltage jump and the actual current response resulting therefrom in a low current range and of a desired voltage jump and the actual current adopted as a response in a high current range close to the nominal current of the three-phase machine to illustrate the influence of the error voltage compensation on the voltage jumps, with the true actual voltage extent also being entered in addition to the desired voltage extent in the two desired voltage diagrams to illustrate the different amounts of deformation in dependence on the current level; and FIG. 4: a schematic representation of an asynchronous machine that is connected to a frequency converter.

As FIG. 4 shows, a three-phase machine 1, for example in the form of an asynchronous motor, can be connected to a frequency converter FU that, for example, converts a sinusoidal voltage 2 applied at the input side into a step-like output voltage $u_d$ with which said asynchronous motor is operated. It is, however, understood that the voltage 2 at the input side just like the converted voltage $u_d$ at the output side can have different properties and the frequency converter FU can implement different conversion properties.

The operation of the frequency converter FU can be variably controlled via a control device 3 that can have an input device 4 to operate and control the three-phase machine 1 in the desired manner.

To be able to determine the error voltage $u_F$ occurring at the frequency converter FU and to be able to compensate it in operation of the three-phase machine 1, said control device 3 can have a determination device 5 that can, for example, be implemented in the form of a software module in the control device 3 to operate the three-phase machine 1 or the frequency converter FU in a determination mode for determining the error voltage and to be able to set specific voltage values at the frequency converter.

Said determination device 5 can in particular comprise a desired voltage module 6 that applies a desired voltage $u_{d,des}$ to the frequency converter FU that increases stagewise at the output side such as is shown in FIG. 1. The desired voltage $u_{d,des}$ can, for example, be raised by a respective unchanging desired voltage jump in steps specified timewise, for example such that the desired voltage $u_{d,des}$ is increased by 0.4 V every three seconds, cf. FIG. 1, with this only to be understood by way of example.

The determination device 5 can furthermore comprise a current measurement device 7 by means of which the step response adopted with respect to the voltage jumps in the form of the actual current $i_{d,act}$ can be measured at the three-phase machine 1, for example. As FIG. 1 shows, the actual current extent $i_{d,act}$ resulting over time can be determined in amperes by means of the current measurement device 7 and the current jumps $\Delta I_{d,act}$ respectively adopted can be determined.

The desired voltage module 6 is here advantageously configured such that the desired voltage is increased so much in the parameter identification mode until a measured current $I_{d,max}$ measured as a response results in the range of the nominal current of the three-phase machine 1. If, for example, the nominal current $I_N$ of the three-phase machine 1 amounts to 25 amperes, the voltage $u_{d,des}$ can be increased for so long until a current in the range of approximately 25 A is adopted.

The excitation with said voltage jumps can here advantageously take place in a stationary state. The three-phase machine 1 can, for example, be excited while at a standstill.

Said determination device 5 can here determine the error voltage $u_F$ using the relationship $$u_F = U_{d,des} - R_1 I_{d,max}$$

where $u_F$ is the error voltage, $u_{d,des}$ is respectively the end value of the desired voltage jump R1 and the stator resistance of the three-phase machine 1 and $i_{d,max}$ is the end value of the step response in the form of the adopted current.

To determine said stator resistance $R_1$ of the three-phase machine 1, said determination device 5 uses the relationship $$R_1 = \frac{\Delta U_{d,des}}{\Delta I_{d,act}},$$

where $R_1$ is said stator resistance, $\Delta U_{d,des}$ is a desired voltage jump, and $\Delta I_{d,act}$ is the step response adopted in this process in the form of the adopted current change, as is shown by way of example in FIG. 1.

In this process, the determination device 5, however, does not use any desired voltage jump and the current change adopted there in a low current range, but rather a voltage jump $\Delta U_{d,des}$ of the desired voltage and the step response adopted there in the form of the current changes $\Delta I_{d,act}$ in a sufficiently high current range that is advantageously close to the nominal current of the end stage of the current converter and/or of the three-phase machine 1. Said desired voltage jump $\Delta U_{d,des}$ and the current change $\Delta I_{d,act}$ adopted in this process can in particular be in a current range of 75%-100% or 90%-100% of the nominal current $I_F$ of the end stage and/or of the nominal current $I_N$ of the three-phase machine 1.

If namely said measurement takes place with a sufficiently high current, the stator resistance $R_1$ can be approximately exactly calculated without taking account of the error voltage. This measurement can ideally be performed in the range of the nominal current of the end stage since the characteristic curve $u_F(i_d)$ extends approximately horizontally in the range of the nominal current, whereby the error voltage is canceled or its influence is negligible. The characteristic curve $(u_F)i_d$ that flattens more and more toward the nominal current can be seen from FIG. 2.

The current dependent deformation of the voltage jump can in particular be seen from FIG. 3. If, for example, with the low current $I_{d,max}$=125.9 mA, the desired voltage jump specified for this of $\Delta U_{d,des}$=1.5 V is looked at, FIG. 3, left hand side there, shows that the voltage jump after the error voltage compensation has taken place is deformed by a relatively large amount so that the real voltage jump $\Delta U_{d,act}$ only amounts to approximately $\Delta U_{d,act}$=119.6 mV.

If, however, such a desired voltage jump of $\Delta U_{d,des}$=1.5 V (from, for example, 16.5 V to 18 V) at a relatively high current of $I_{d,max}$=11.3 A, the actual voltage jump is deformed by a much smaller amount, cf. FIG. 3, right hand side there. The real jump level $\Delta U_{d,act}$ amount to approximately 1.3 V here.

If the desired voltage jump in a current range disposed even closer to the nominal current of the end stage is looked at, in particular in the range of approximately $I_N$=25 A, the actual real jump level of the voltage jump $\Delta U_{d,act}$ even more exactly approximates the specified desired value $\Delta U_{d,des}$=1.5 V since the characteristic curve of the error voltage $U_F(i_d)$ extends approximately horizontally in the range of the nominal current $I_N$=25 A (no longer shown in FIG. 2 since the characteristic curve $u_F(i_d)$ is there only shown up to a current of approximately 12.5 A).

If the stator resistance $R_1$ is determined from the values acquired at said high current $I_{d,max}$ 32 11.3 A, the stator resistance $R_1$ can be calculated as follows using the above-specified relationship:

$$R_1 = \frac{1.5 \text{ V}}{11.2732 A - 9.8689 \text{ A}} = 1.07 \Omega$$

The characteristic curve extent of the current dependent error voltage $U_F(i_d)$ can then be determined from the determined stator resistance $R_1$ using said relationship $$U_F = U_{d,des} - R_1 I_{d,max}$$

for example in that linear interpolation is performed between the 13 measurement points shown there.

We claim:

1. A method of determining an error voltage of a current converter to which a load is connected, comprising:
   applying a voltage at the output side to the current converter, wherein the applying comprises increasing the voltage stagewise or stepwise;
   measuring the current adopted as the step response in the applying of the voltage,
   determining the error voltage from the current measured as the step response and from a resistance of the load; and
   determining the resistance from a desired voltage jump from a measured actual current jump in a current range of at least 33% or of at least 50% of a nominal current of the current converter.

2. The method of claim 1, wherein the determination of the resistance of the load is carried out independently of the error voltage of the current converter.

3. The method of claim 1, further comprising selecting the desired voltage jump for determining the resistance such that the step response adapted in the form of the final value of the current is measured in a current range of 75% to 125% or 90% to 105% of the nominal current of an end stage of the current converter.

4. The method of claim 1, further comprising determining the resistance in accordance with the relationship:

$$R_1 = \frac{\Delta U_{d,des}}{\Delta I_{d,act}}$$

where $R_1$ is the resistance of the load, $\Delta U_{d,des}$ is a predetermined desired voltage jump, and $\Delta I_{d,act}$ is the actual current jump measured at said desired voltage jump.

5. The method of claim 1, further comprising determining the error voltage in accordance with the relationship:

$$U_F = U_{d,des} - R_1 I_{d,max}$$

where $u_F$ is the error voltage, $U_{d,des}$ is an end value of the desired voltage jump, $R_1$ is the resistance of the load, and $I_{d,max}$ is an end value of the current measured as the step response.

6. The method of claim 1, further comprising determining an error voltage characteristic curve that indicates the error voltage in dependence on the current.

7. The method of claim 6, wherein the determining of the error voltage characteristic curve further comprises determining from a plurality of measurement points of the error voltage, wherein the determining from a plurality of measurement points comprises a linear interpolation between such measurement points.

8. The method of claim 1, further comprising determining the error voltage in operation of the load, with the resistance of the load and the actual current used for this purpose being determined in operation of the load.

9. The method of claim 8, further comprising operating the load in a stationary state in the determination of the error voltage, wherein the stationary state comprises being at a standstill.

10. The method of claim 1, wherein a three-phase machine is connected to the current converter as the load, and wherein the three-phase machine comprises an asynchronous machine.

11. The method of claim 1, wherein the current converter comprises a frequency converter.

12. A method of operating and/or controlling a three-phase machine, comprising:
determining and optionally compensating an error voltage of a current converter to which the three-phase machine is connected,
determining the error voltage of the current converter, wherein the determining of the error voltage comprises the method of claim 1.

13. The method of claim 12, further comprising determining a current dependent correction value for the control of the current converter, wherein the correction value compensates the error voltage, with reference to an error voltage characteristic curve that is determined for the current converter and that indicates the error voltage of the current converter in dependence on the current.

14. The method of claim 12, selecting an end stage of the current converter to match the three-phase machine such that a nominal current of the three-phase machine corresponds to the nominal current of the end stage of the current converter.

15. A three-phase machine, wherein the three-phase machine is an asynchronous machine, the three-phase machine comprising:
power electronics comprising a current converter comprising a frequency converter, and a control device to control the current converter for controlling the operation of the three-phase machine;
wherein the control device comprises a determination device for determining an error voltage of the current converter; and wherein the determination device has a desired voltage module for setting a desired voltage increased jumpwise at an output side at the current converter and a current detection device for detecting an actual current adopted as the step response;
wherein the determination device is configured to determine the error voltage in operation of the three-phase machine from the actual current measured as the step response and from a resistance of the three-phase machine and to determine the resistance from a desired voltage jump and an actual current jump determined in a current range of at least 30% or of at least 50% of the nominal current of the end stage.

16. The three-phase machine of claim 15, wherein the determination device is configured
to determine the resistance of the three-phase machine independently of the error voltage; and/or
to use a desired voltage jump and an actual current jump in a current range of 75% to 125% or 90% to 105% of the nominal current of an end stage of the current converter to determine the resistance; and/or
to determine the resistance in accordance with the relationship:

$$R_1 = \frac{\Delta U_{d,des}}{\Delta I_{d,act}},$$

wherein $R_1$ is the resistance, $\Delta U_{d,des}$ is the predetermined desired voltage jump, and $\Delta I_{d,act}$ is the actual current jump determined in this process; and/or
to determine the error voltage in accordance with the relationship $u_F = U_{d,des} - R_1 I_{d,max}$, where $u_F$ is the error voltage, $U_{d,des}$ is the end value of the desired voltage jump, $R_1$ is the resistance, and $I_{d,max}$ is the end value of the current determined in the desired voltage increased jumpwise.

\* \* \* \* \*